United States Patent
Valkó et al.

(12)

(10) Patent No.: US 6,266,323 B1
(45) Date of Patent: *Jul. 24, 2001

(54) RESOURCE ESTIMATION FOR VARIABLE BIT RATE DATA SOURCES

(75) Inventors: András Valkó, Budapest (HU); Lars Westberg, Enköping (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,520

(22) Filed: Apr. 18, 1997

(51) Int. Cl.$^7$ .............................. H04J 3/14; G06F 15/16
(52) U.S. Cl. ........................................... 370/230; 709/227
(58) Field of Search .......................... 370/224, 230–231, 370/232, 233, 234, 235, 237, 252, 468, 395; 395/200.62, 200.65; 709/226, 227, 228, 229, 235

(56) References Cited

U.S. PATENT DOCUMENTS

| | | | |
|---|---|---|---|
| 5,153,877 | * 10/1992 | Esaki et al. | 370/253 |
| 5,166,894 | * 11/1992 | Saito | 370/252 |
| 5,278,828 | * 1/1994 | Chao | 370/418 |
| 5,280,483 | * 1/1994 | Kamoi et al. | 370/234 |
| 5,357,507 | 10/1994 | Hughes et al. | |
| 5,530,695 | * 6/1996 | Dighe et al. | 370/232 |
| 5,548,581 | * 8/1996 | Makrucki | 370/232 |
| 5,583,857 | * 12/1996 | Soumiya et al. | 370/233 |
| 5,600,641 | * 2/1997 | Duault | 370/400 |
| 5,677,907 | * 10/1997 | Hamada et al. | 370/253 |
| 5,691,975 | * 11/1997 | Hamada et al. | 370/232 |
| 5,850,385 | * 12/1998 | Esaki | 370/216 |
| 5,881,049 | * 3/1999 | Beshai | 370/230 |

FOREIGN PATENT DOCUMENTS

| | | |
|---|---|---|
| 0 691 769 A1 | 1/1996 | (EP) . |
| 0 756 403 A2 | 1/1997 | (EP) . |
| WO 95/17061 | 6/1995 | (WO) . |

* cited by examiner

Primary Examiner—Wellington Chin
Assistant Examiner—Steven Nguyen
(74) Attorney, Agent, or Firm—Burns, Doane, Swecker & Mathis, L.L.P.

(57) ABSTRACT

A determination whether to establish a new connection that will supply new variable bit rate data packets to be transmitted in a shared system for transmitting variable bit rate data packets is made by determining, for the new connection, a value of a moment generating function defined based on the number of possible data packet sizes for the new connection, $(R_i, P_i)$ pairs representing possible new connection data packet sizes, $R_i$, with corresponding assigned probabilities, $P_i$, and $\theta$ is an arbitrary positive real number. A determination is then made whether any value of $\theta$ exists that satisfies the Chernoff bound for all established connections and the new connection, given a length of a buffer for storing data packets supplied to the shared system for transmitting variable bit rate data packets, and a predefined packet loss rate that can be tolerated in the shared system for transmitting variable bit rate data packets. If a value of $\theta$ exists that satisfies the Chernoff bound, then the new connection is established, else it is rejected. In another aspect, a maximum number of connections in the shared system is determined, given a transmission rate of the shared system.

30 Claims, 7 Drawing Sheets

RESOURCE ESTIMATION FOR VARIABLE BIT RATE DATA SOURCES

BACKGROUND

The present invention relates to transmission of variable bit rate data via a shared medium, and more particularly to techniques for determining whether a shared medium can accept data from a variable bit rate data source without exceeding tolerable packet loss rates and delay limits.

In many systems, sampled data is generated at regular intervals (i.e., the "sampling period") in the form of variable size packets. Variable bit rate compressed speech sources are one source for such data. It is typical for a number of sources of variable size packets to use time multiplexing techniques to share a transmission medium. As an example, asynchronous transfer mode (ATM) is a standard protocol that is commonly used for transmitting asynchronous telecommunication data within a telecommunication system for one or more applications that provide variable size packets. The ATM protocol, however, is based on the transmission of data in fixed size data packets known as ATM cells. The protocol for each ATM cell is the same, wherein, each ATM cell contains a forty-eight octet payload and a five octet header. In general, ATM is well known in the art.

The telecommunication data associated with each application is initially in a data transfer format that is application specific. If ATM is to be used for transporting the data, the application specific data format must be adapted so that it is compatible with the ATM protocol. This is accomplished by an ATM adaptation layer (AAL) 101, as illustrated in FIG. 1. Referring now to FIG. 1, the application layer 102 represents telecommunication data arriving from a specific telecommunication data application. The task of the AAL 101, as mentioned, is to reformat the data so that the data is compatible with the ATM protocol. Once reformatted, the ATM layer 103 can transport the data to a desired receiving unit.

A commonly employed AAL is AAL2, which is sometimes referred to as AALm. AAL2, is typically used to transform low bit rate, asynchronous data, such as cellular voice data into a format that may be supplied to the ATM layer 103. More particularly, AAL2 segments low bit rate data streams into small data packets, which are often called minicells or microcells. The small data packets from a particular low bit rate, asynchronous data source are then multiplexed together with small packets from other similar data sources to form ATM cells. By segmenting the data into smaller, variable size data packets and by multiplexing the small packets from multiple data sources, data transportation delays are reduced and bandwidth utilization is improved. In addition, transportation delays can be further reduced and bandwidth utilization further improved by allowing the small data packets to overlap between adjacent ATM cells, as illustrated in FIG. 2.

In known systems, when variable bit rate data is transmitted via a shared medium (e.g., through a leased line of constant bit rate), the utilization (efficiency) of the shared medium is low because the compressed rate is normally below the allocated space in the shared medium. This will typically be the case if, for example, a Virtual Private network is used to carry telephone connections between different sites of a company, or if a cellular operator uses leased lines to carry compressed voice packets. The low utilization is generally a consequence of the fact that the design of conventional systems accommodates worst-case situations by assuming that each data packet will have its maximum size, thereby ignoring the fact that an individual data packet will often be smaller than its maximum possible size.

Conventional systems can increase efficiency by reducing the allocated capacity while applying buffering at the entrance of the shared medium. Buffering is necessary because the reduction of the allocated capacity on the shared medium eliminates any guarantee that the arriving data packets can be transmitted immediately. If the total arrival rate is temporarily higher than the total allocated capacity, data packets must be discarded or buffered. This will result in excessive transmission delay and/or information loss which can seriously impact the quality of service where the data is, for example, compressed speech data.

Consequently, there is a need for techniques of utilizing and designing transmission mediums that are to be shared by variable bit rate data sources.

SUMMARY

In accordance with one aspect of the present invention, a new connection that will supply new variable bit rate data packets to be transmitted may be established in a shared system for transmitting variable bit rate data packets. The new variable bit rate data packets may be, for example, new variable rate speech packets. This is performed by determining whether establishment of a new connection will cause the shared system to exceed a predefined sample loss rate by using information about a data packet repetition rate that is common to all connections and information about a distribution of packet sizes for each existing connection and for the new connection. Then, the new connection is established if it is determined that the predefined sample loss rate will not be exceeded. Otherwise, the new connection is rejected if it is determined that the predefined sample loss rate will be exceeded.

In one embodiment, establishing or rejecting a new connection is performed by determining, for the new connection, a value of a moment generating function defined as:

$$\psi_X(\Theta) = \sum_{i=1}^{S} P_i e^{\Theta R_i}$$

where S is the number of possible data packet sizes for the new connection, $(R_i, P_i)$ pairs are possible new connection data packet sizes, $R_i$, with corresponding assigned probabilities, $P_i$, and $\Theta$ is an arbitrary positive real number. Then, a determination is made regarding whether any value of $\Theta$ exists that satisfies the Chernoff bound as expressed in the following inequality:

$$-\Theta L_{buf} + \sum_j \log \psi_{X_j}(\Theta) \leq \log P_e$$

where j indexes through all established connections and the new connection, $L_{buf}$ is a length of a buffer for storing data packets supplied to the shared system for transmitting variable bit rate data packets, and $P_e$ is a predefined packet loss rate that can be tolerated in the shared system for transmitting variable bit rate data packets. If a value of $\Theta$ exists that satisfies the Chernoff bound, then the new connection is established. Otherwise, if no value of $\Theta$ exists that satisfies the Chernoff bound, then the new connection is rejected.

In another aspect of the invention, the step of determining whether any value of $\Theta$ exists that satisfies the Chernoff bound comprises the step of retrieving values of the moment generating function for all established connections from data storage means.

In yet another aspect of the invention, $L_{buf}$ is determined in accordance with the following equation:

$$L_{buf} = D_{limit} \cdot r$$

where $D_{limit}$ is a predefined delay limit and r is a predefined rate of packet transmission in the shared system for transmitting variable bit rate data packets.

In still another aspect of the invention, the buffer is a first-in-first-out (FIFO) queue, and the technique further comprises the step of inserting each arriving data packet at the end of the FIFO queue.

In another embodiment of the invention, a new connection that will supply new variable bit rate data packets to be transmitted in a shared system for transmitting variable bit rate data packets may be established, wherein every data source in the shared system provides variable bit rate data packets having identical size distributions. The new variable bit rate data packets may be, for example, new variable rate speech packets. This is accomplished by determining θ value of a that minimizes the left side of the inequality:

$$-\Theta L_{buf} + n \cdot \log \psi_x(\Theta) \leq \log P_e$$

where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, and $$\psi_X(\Theta) = \sum_{i=1}^{S} P_i e^{\Theta R_i}$$

where S is the number of possible data packet sizes for each connection, $(R_i, P_i)$ pairs are possible connection data packet sizes, $R_i$, with corresponding assigned probabilities, $P_i$, and θ is an arbitrary positive real number. The determined value of θ and the inequality are then used to determine n, the maximum number of speech connections. The new connection is established if the number of existing connections is less than the determined value of n. Otherwise, the new connection is rejected if the number of existing connections is greater than or equal to the determined value of n.

In yet another embodiment, a rate of transmission of a shared system for transmitting variable bit rate data packets is determined, wherein every data source in the shared system provides variable bit rate data packets having identical size distributions. The rate that is determined may be used to set the rate of transmission in the shared system. This is performed by determining a value for a minimum rate, r, in accordance with the following dimensioning rule:

$$n \cdot \alpha(\Theta_0) + \beta(\Theta_0) < r$$

where n is a predetermined maximum number of connections, $$\alpha(\Theta_0) = \frac{\log \psi_X(\Theta_0)}{D_{limit} \cdot \Theta_0}$$

$$\beta(\Theta_0) = -\frac{\log P_e}{D_{limit} \cdot \Theta_0}$$

and $\Theta_0$ is selected so that $$-\Theta_0 L_{buf} + n_0 \cdot \log \psi_x(\Theta_0)$$

is minimal for a value of $n_0$ that is selected arbitrarily in the same order of magnitude in which the dimensioning rule will be used, where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, $D_{limit}$ is a predefined delay limit and $$\psi_X(\Theta) = \sum_{i=1}^{S} P_i e^{\Theta R_i}$$

where S is the number of possible data packet sizes for each connection, $(R_i, P_i)$ pairs are possible data packet sizes, $R_i$, with corresponding assigned probabilities, $P_i$, and θ is an arbitrary positive real number. The rate of transmission of the shared system for transmitting variable bit rate data packets is then set to be greater than or equal to the value of the minimum rate, r.

BRIEF DESCRIPTION OF THE DRAWINGS

The objects and advantages of the invention will be understood by reading the following detailed description in conjunction with the drawings in which.

DETAILED DESCRIPTION

Figure 1:
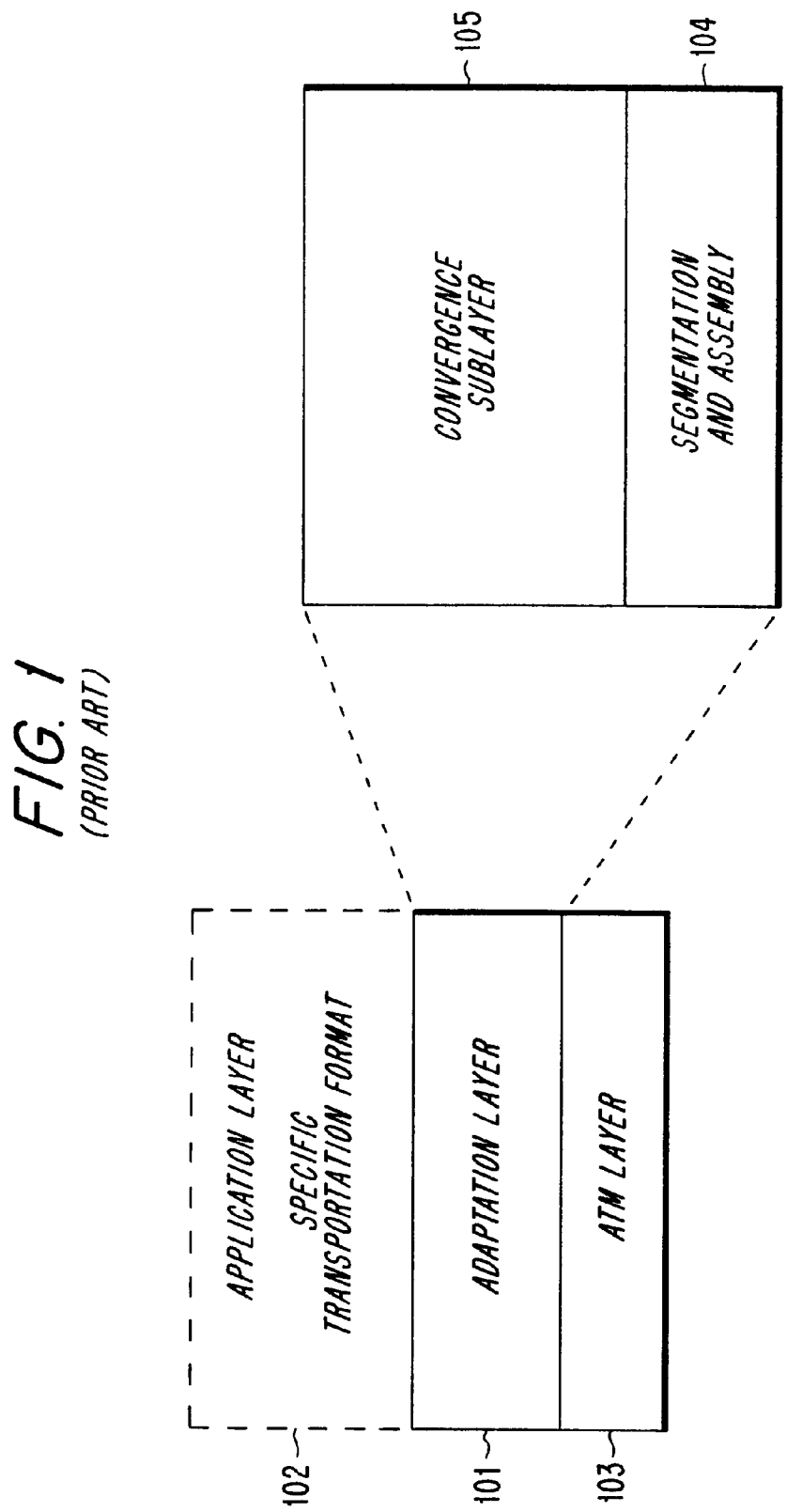
FIG. 1 depicts the asynchronous transfer mode (ATM) adaptation layer (AAL) in accordance with the prior art.
Figure 2:
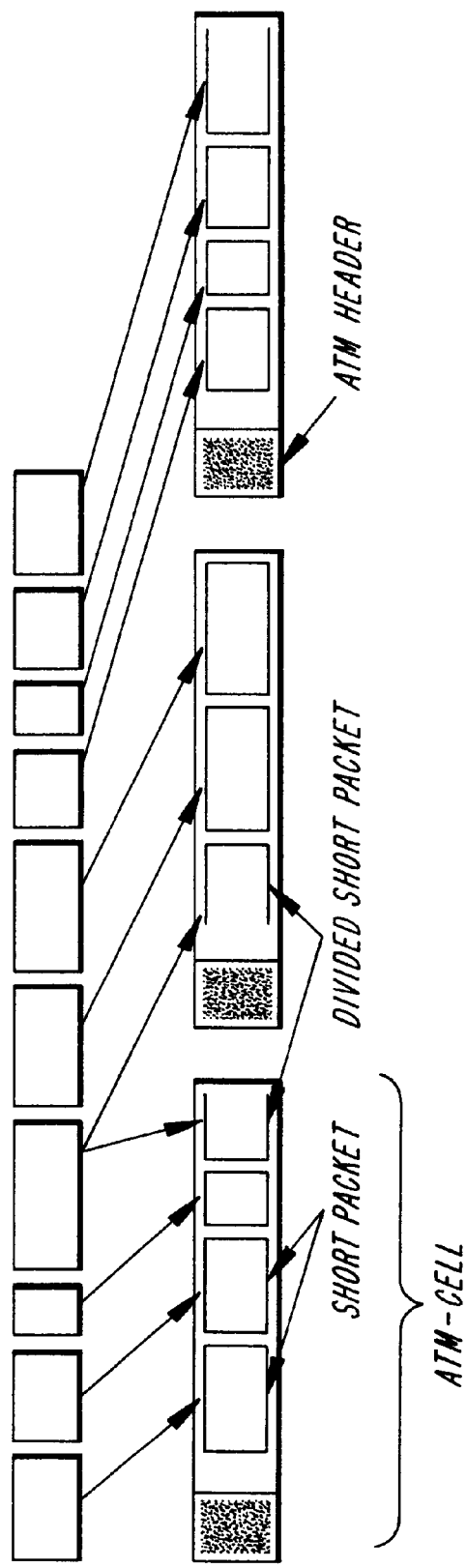
FIG. 2 depicts the practice of allowing short packets to overlap adjacent ATM cells in accordance with the prior art.

The various features of the invention will now be described with respect to the figures, in which like parts are identified with the same reference characters.

Many of the techniques disclosed here are described in mathematical terms. However, it should be recognized that this is primarily a convenience that is done in order to facilitate an understanding of the invention by those having skill in this art. However, it should be appreciated that the various parameters described here really refer to real-world properties, such as signal packet sizes and transmission rates. Furthermore, it should be understood that a practical application of the various techniques taught here is advantageously performed by processing equipment (e.g., a programmable computer), and may also be embodied as computer program code embodied on a computer readable storage medium, such as a magnetic storage medium (e.g., diskette) or a CD ROM.

As mentioned in the BACKGROUND section of this disclosure, conventional approaches to making utilization and design decisions regarding transmission mediums that are to be shared by variable bit rate data sources result in excessive transmission delay and/or information loss which can seriously impact the quality of service. In accordance with one aspect of the invention, this delay and loss can be limited and kept below a tolerated threshold if the decision upon acceptance of speech connection setup requests is made according to an estimation of required bandwidth, multiplexing delay, and of tolerable packet loss rate.

In the following description, exemplary embodiments of the invention will be described in connection with an environment in which the variable bit rate data is supplied by a variable bit rate compressed speech source. However, this description is in no way intended to limit the scope of the invention, which can instead be applied to any variable bit rate data environment.

As each speech source sends speech packets periodically with the same period, time can be subdivided into frames of length equal to the speech packet repetition period. Within such frames, each speech connection sends exactly one speech packet. For simplicity it can first be assumed that these packets arrive at the beginning of the frames (the method can be extended to more general cases). The packets are then inserted into a buffer and will be transmitted one after the other.

Because the buffer will be emptied at a constant rate equal to the capacity of the shared medium, the transmission of the packets will be completed within a time equal to $$\frac{\text{Sum of sample sizes}}{\text{Rate of shared medium}} \quad (1)$$

Thus, in order to ensure that a pre-defined fixed delay limit is never exceeded, the length of the buffer must be set as $$L_{buf} = D_{limit} \cdot r \quad (2)$$

where $D_{limit}$ is the delay limit and r is the rate of the shared medium. The $D_{limit}$ must be less than or equal to the speech sampling period.

Figure 3:
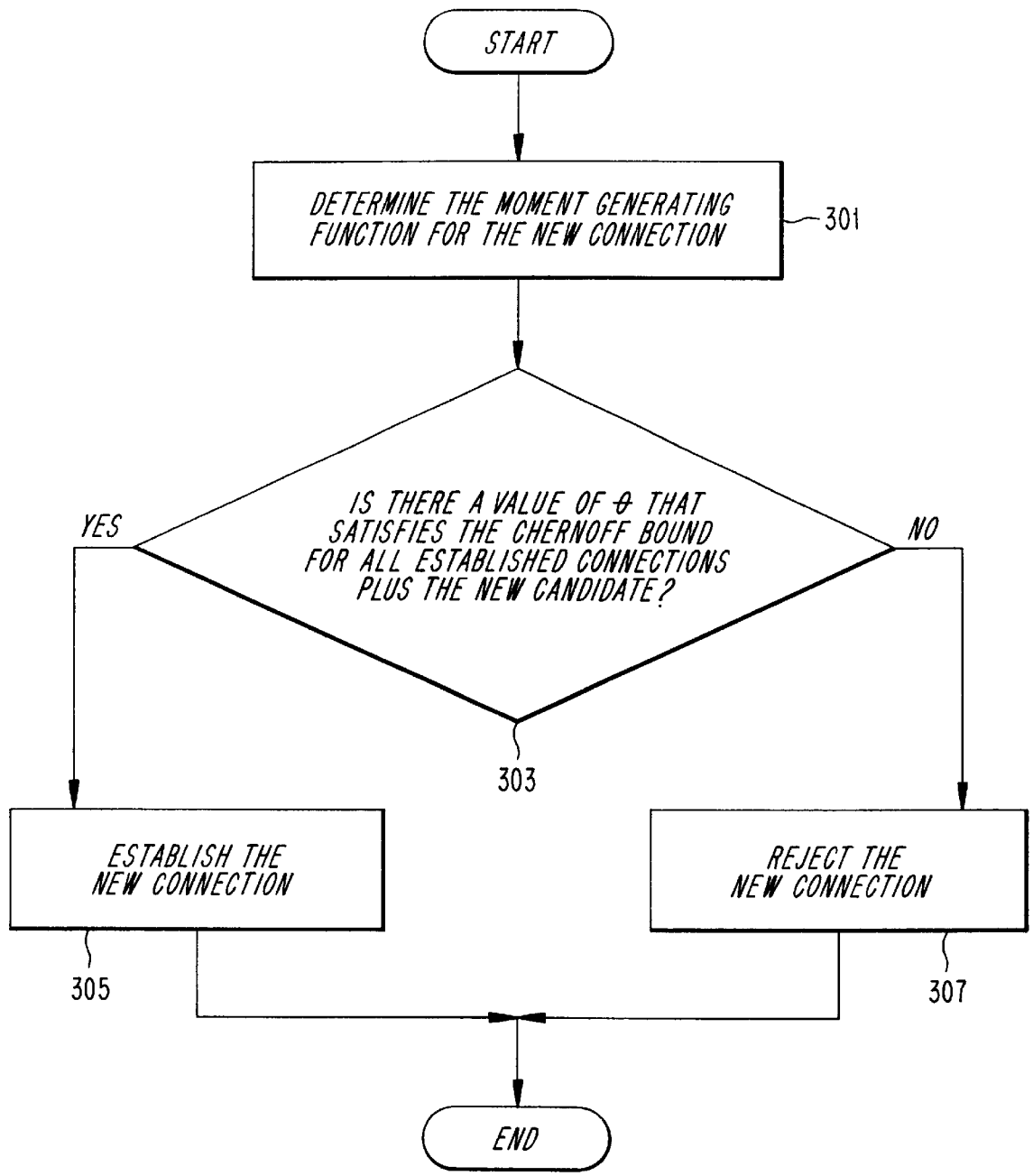
FIG. 3 is a flowchart depicting steps for establishing a connection in accordance with an aspect of the invention.

In accordance with one aspect of the invention, the following rules (illustrated in the flowchart of FIG. 3) should be applied when a new speech connection setup request arrives:
(1) For the new connection, determine the moment generating function defined as in Equation (3) (step 301). (The moment generating functions of already established connections are assumed to be already known.)

$$\psi_X(\Theta) = \sum_{i=1}^{S} P_i e^{\Theta R_i} \quad (3)$$

where S is the number of possible speech packet sizes for the new connection, ($R_i$, $P_i$) pairs are possible speech packet sizes, $R_i$, with the corresponding assigned probability $P_i$, (the $P_i$ sum up to one), and $\Theta$ is an arbitrary positive real number. Note that in Equation (3), the subscript X is the variable for the packet size.
(2) A $\Theta$ must be searched for that satisfies the Chernoff bound (step 303), as expressed in the inequality given by Equation (4):

$$-\Theta L_{buf} + \sum_j \log \psi_{X_j}(\Theta) \le \log P_e \quad (4)$$

where j indexes through all the established connections including the new candidate; $P_e$ is the packet loss rate that can be tolerated (defined in advance). If such a $\Theta$ is found, the connection may be established (step 305), otherwise it must be rejected (step 307).

In operation, each arriving speech packet should be inserted into the buffer. In one embodiment, the buffer may be a first-in-first-out (FIFO) queue, in which each arriving speech packet is inserted at the end of the FIFO queue. If there is not enough available space in the buffer, one or more speech packets must be discarded. The discarded speech packets can include the one that just arrived, or one or more of the packets already stored in the buffer. The selection of which packets to discard does not affect the delay or loss limits of any connection.

At the same time, as long as the buffer is not empty, its content must be transmitted via the shared medium constantly at the maximum possible rate (r).

In another aspect of the invention, the above-stated principles are applied in an environment in which the sources provide speech packets of identical size distribution. In this case, the determination of the moment generating function only needs to be performed once (possibly in advance) and the condition expressed in Equation (4) simplifies into:

$$-\Theta L_{buf} + n \cdot \log \psi_x(\Theta) \le \log P_e \quad (5)$$

Figure 4:
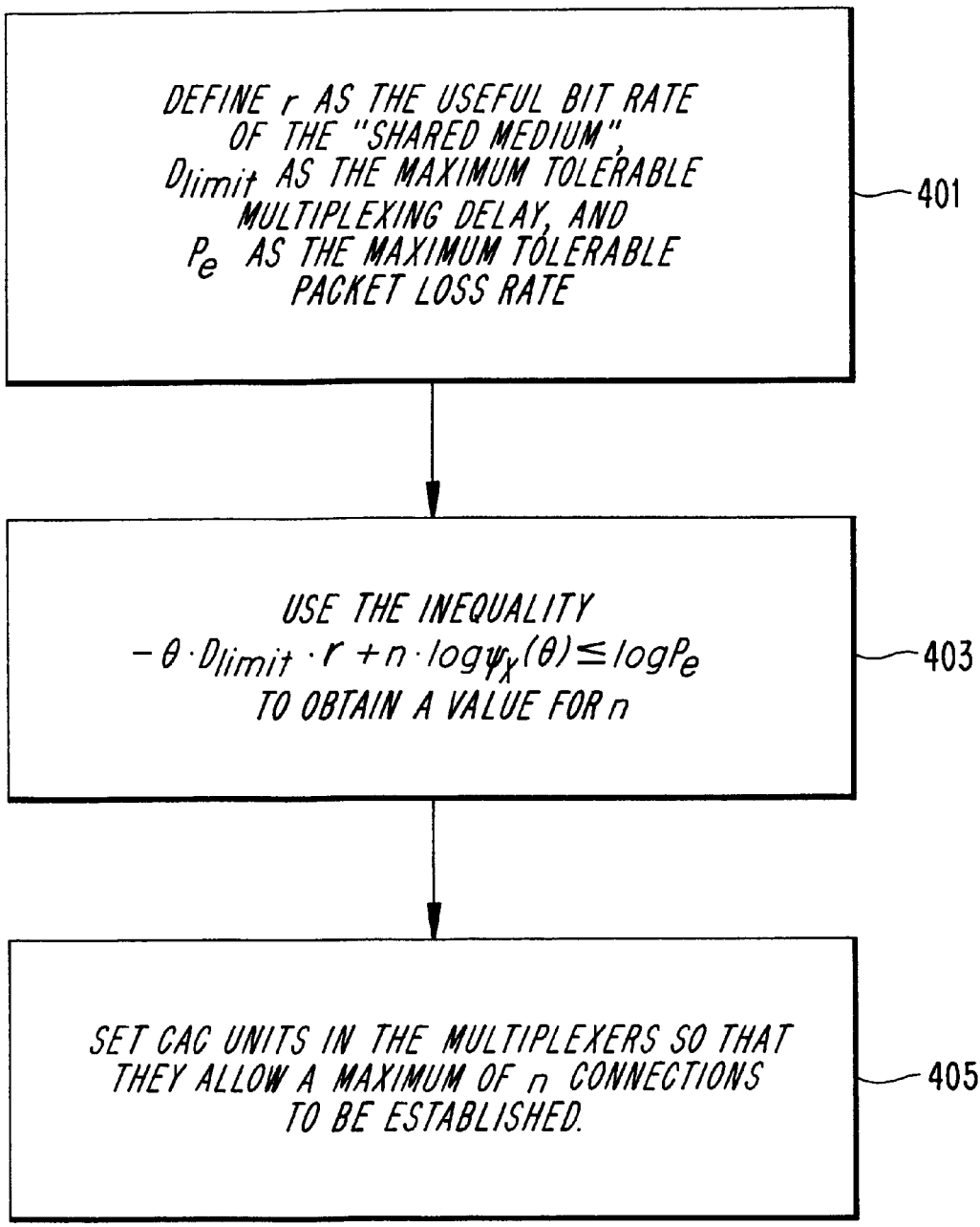
FIG. 4 is a flowchart depicting a technique for setting or adjusting the maximum number of connections to be permitted in a shared system, in accordance with the invention.

Equation (5) can be used to determine n, the maximum number of speech connections, in advance by searching for the minimum of the left side of the inequality as a function of $\Theta$. This technique is illustrated in FIG. 4. At step 401, values for r, the useful bit rate of the shared medium, $D_{limit}$, the maximum tolerable multiplexing delay, and for $P_e$, the maximum packet loss rate that can be tolerated, are defined.

At step 403, Equations (2) and (5) are used to obtain a value for n, the maximum number of speech connections that can be permitted to be established on the shared medium. This is performed by rearranging the inequality so that it will show a relation in which n on one side of the inequality is less than or equal to a function of $\Theta$ on the other. To find a maximum acceptable value of n, one finds the maximum of the function of $\Theta$, using standard techniques. By having a predetermined value for n, a connection acceptance/rejection rule is simply the following: The maximum number of connections that can be established at any time is n. If this limit is reached, the request must be rejected, otherwise accepted. In a typical network, this acceptance/rejection rule is brought about by setting the Connection Acceptance Control (CAC) (alternatively called "Call Admission Control") units in the multiplexers so that they allow a maximum of n connections to be established. In practice, this may be performed while the system is running by determining the value for n offline, and then applying it to the running system.

In another aspect of the invention, if the sources provide speech packets of identical size distribution and the tolerated speech packet loss rate is fixed, the following approximation can be used to determine whether or not to establish or reject a new connection, and also for determining, and ultimately setting, the necessary minimum required rate of transmission on the shared medium (r), given an expected maximum number of speech connections, n, or alternatively determining, and ultimately setting, a maximum number of speech connections, n, given an expected rate of transmission on the shared medium (r),:

$$n \cdot \alpha(\Theta_0) + \beta(\Theta_0) < r \quad (6)$$

where $$\alpha(\Theta_0) = \frac{\log \psi_X(\Theta_0)}{D_{limit} \cdot \Theta_0} \quad (7)$$

$$\beta(\Theta_0) = -\frac{\log P_e}{D_{limit} \cdot \Theta_0} \quad (8)$$

Figure 5:
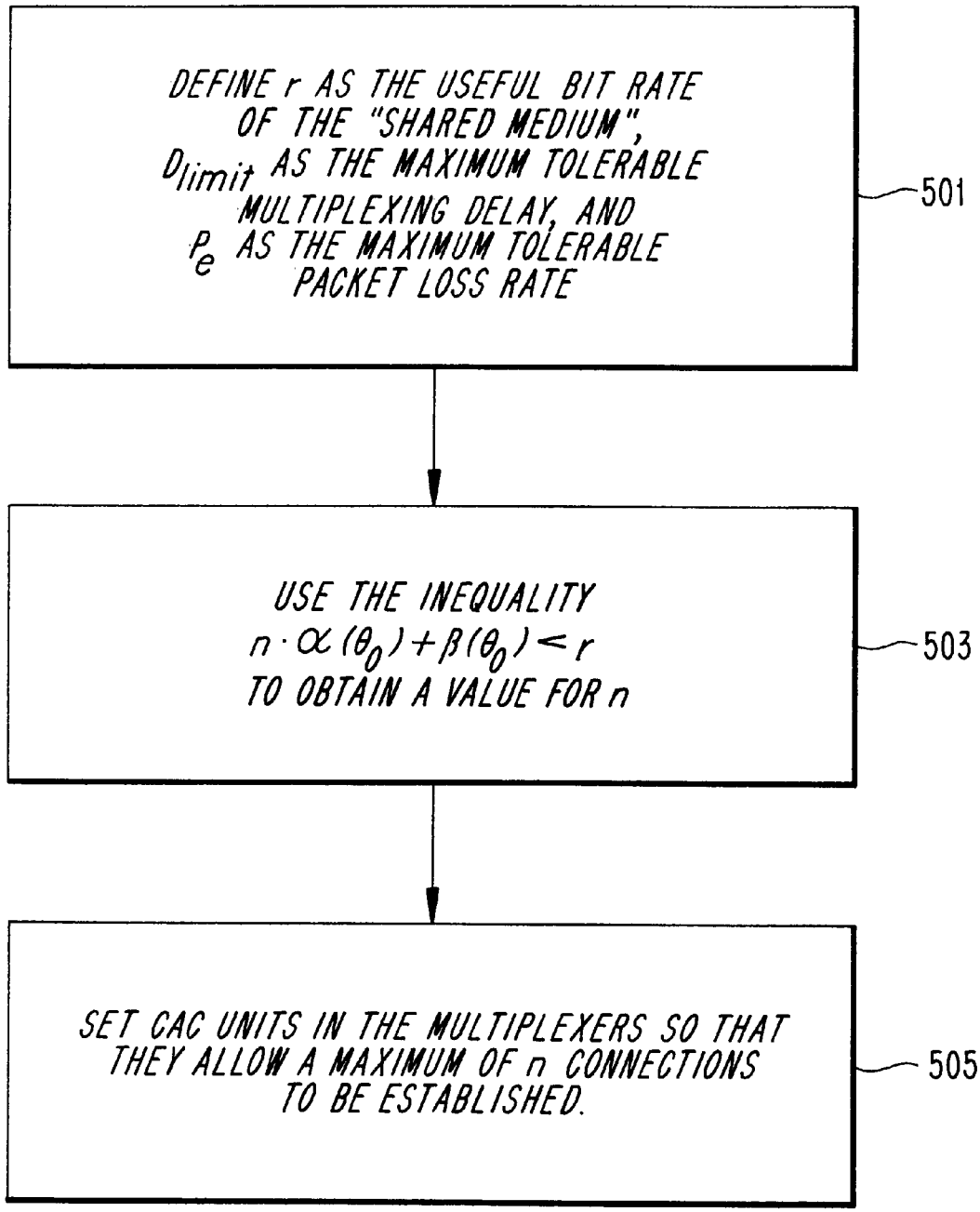
FIG. 5 is a flowchart depicting a technique for setting or adjusting the maximum number of connections to be permitted in a shared system, in accordance with an alternative embodiment of the invention.

These techniques will now be described in greater detail. Referring first to FIG. 5, this shows a technique for setting or adjusting the maximum number of connections to be permitted in a shared system. At step 501, values for r, the useful bit rate of the shared medium, $D_{limit}$, the maximum tolerable multiplexing delay, and for $P_e$, the maximum packet loss rate that can be tolerated, are defined.

At step 503, Equations (6), (7) and (8) are used to obtain a value for n, the maximum number of connections to be permitted in the shared system. A value for $\Theta_0$ is selected so that $$-\Theta_0 L_{buf} + n_0 \cdot \log \psi_x(\Theta_0) \quad (9)$$

is minimal for a value of no that is selected arbitrarily in the same order of magnitude in which the dimensioning rule of Equation (6) will be used. The step of determining a value for $\Theta_0$ need not be performed every time a new value of n is to be determined. Rather, a previously determined value of $\Theta_0$ may be repeatedly used whenever n needs to be reevaluated due to a change in r and/or $D_{limit}$.

Then, at step 505, the CAC units in the multiplexers are set so that they allow a maximum of n connections to be established. In practice, this may be performed while the system is running by determining the value for n offline, and then applying it to the running system.

Figure 6:
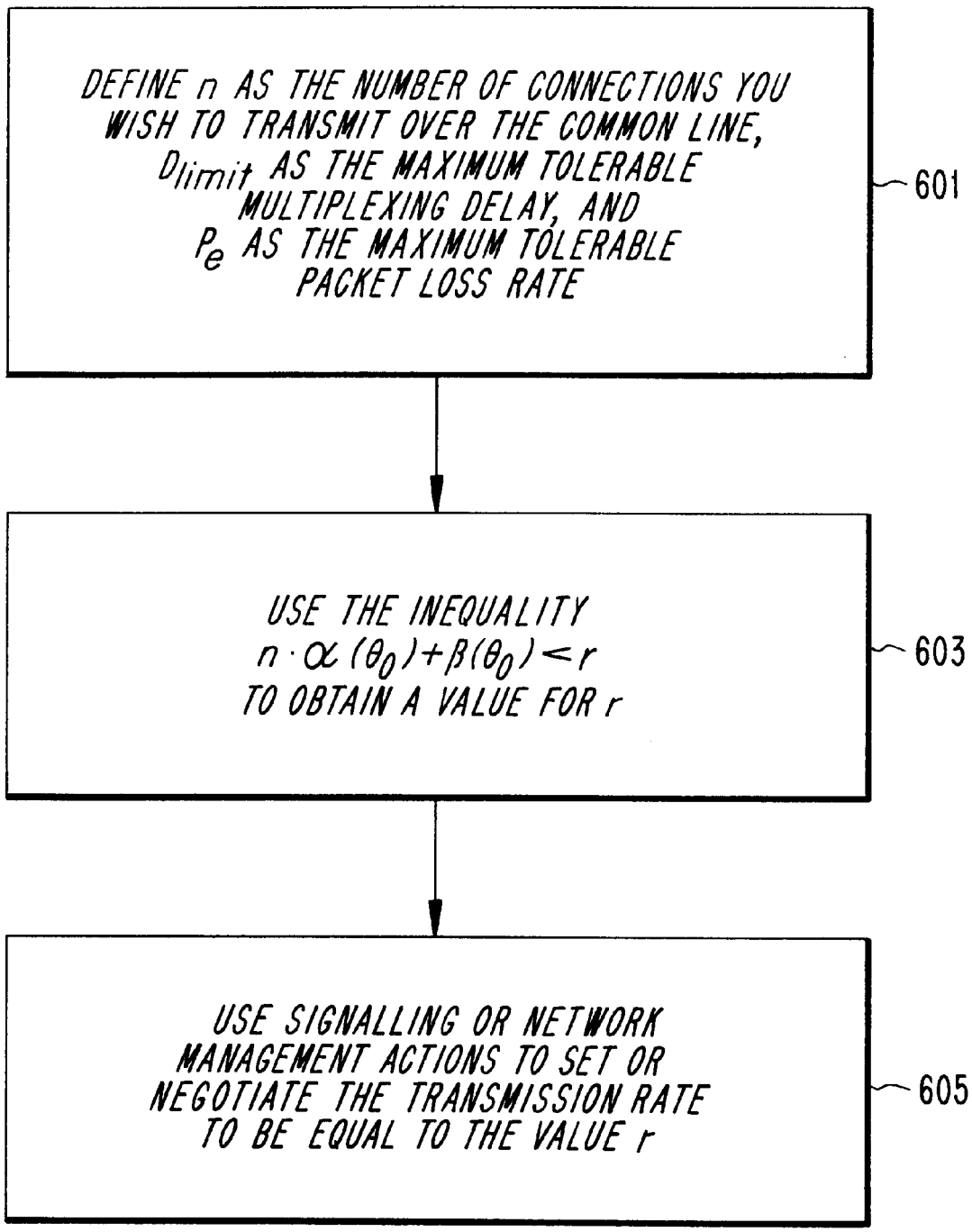
FIG. 6 is a flowchart depicting a technique for setting or adjusting the necessary minimum required rate of transmission on the shared medium, in accordance with the invention.

Referring now to FIG. 6, this shows a technique for setting or adjusting the necessary minimum required rate of transmission on the shared medium (r). At step 601, values for n, the number of connections that it is desired to transmit over the shared medium, $D_{limit}$, the maximum tolerable multiplexing delay, and for $P_e$, the maximum packet loss rate that can be tolerated, are defined.

At step 603, Equations (6), (7) and (8) are used to obtain a value for r, the necessary minimum required rate of transmission on the shared medium. A value for $\Theta_0$ is selected so that Equation (9) is minimal for a value of no that is selected arbitrarily in the same order of magnitude in which the dimensioning rule of Equation (6) will be used. The step of determining a value for $\Theta_0$ need not be performed every time a new value of n is to be determined. Rather, a previously determined value of $\Theta_0$ may be repeatedly used whenever r needs to be reevaluated due to a change in n and/or $D_{limit}$.

Then, at step 605, signalling or network management actions are performed to either set or negotiate the transmission rate to be equal to the value r.

Figure 7:
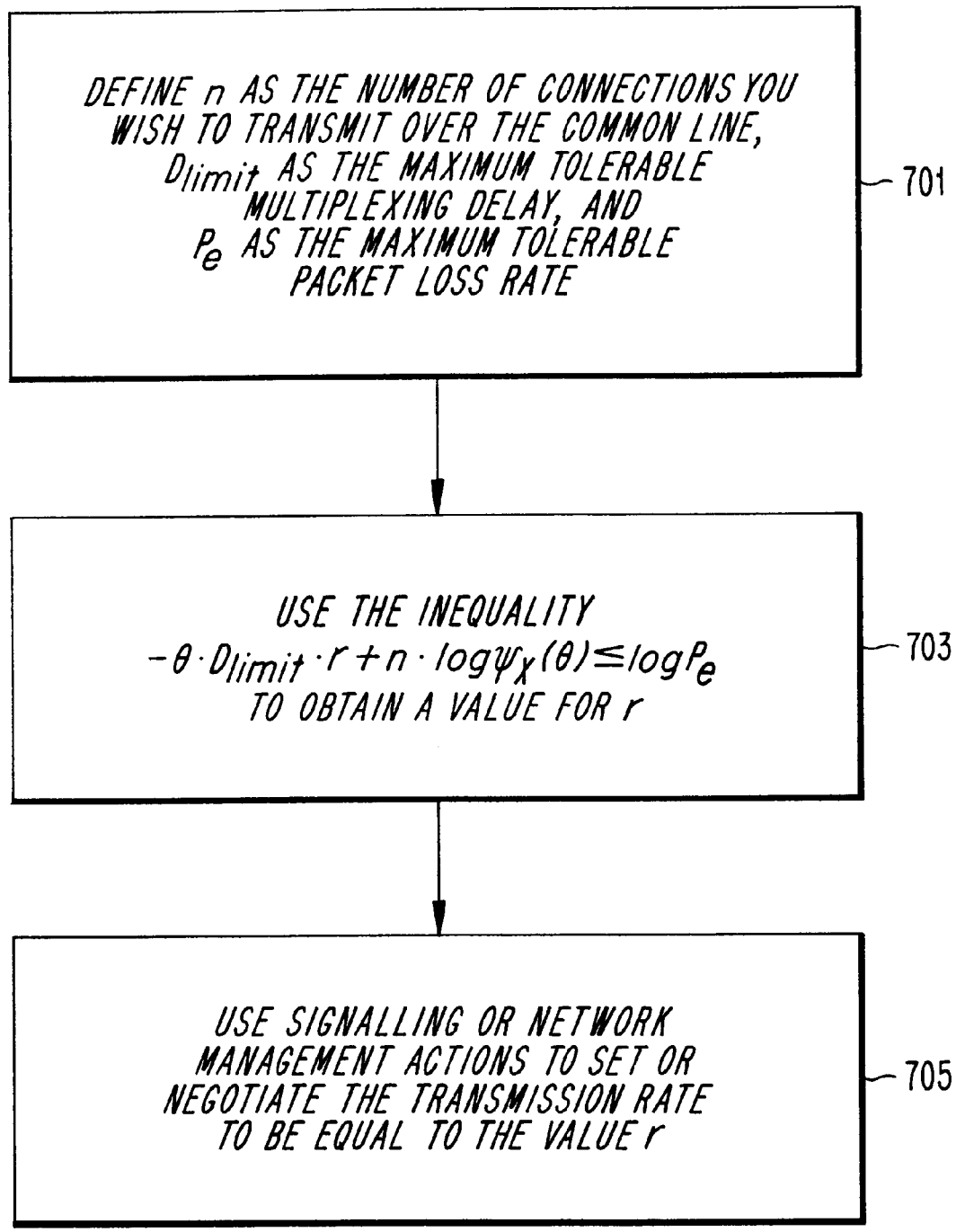
FIG. 7 is a flowchart depicting a technique for setting or adjusting the necessary minimum required rate of transmission on the shared medium, in accordance with an alternative embodiment of the invention.

In an alternative embodiment, a value for r may be determined by means of Equation (5). Referring now to FIG. 7, at step 701, values for n, the number of connections that it is desired to transmit over the shared medium, $D_{limit}$, the maximum tolerable multiplexing delay are defined, and for $P_e$, the maximum packet loss rate that can be tolerated, are defined.

At step 703, Equations (2) and (5) are used to obtain a value for r, the necessary minimum required rate of transmission on the shared medium. This is performed by rearranging the inequality so that it will show a relation in which r on one side of the inequality is greater than or equal to a function of θ on the other. To find a minimum acceptable value of r, one finds the minimum of the function of θ.

Then, at step 705, signalling or network management actions are performed to either set or negotiate the transmission rate to be equal to the value r.

In all of the techniques described above, there is a requirement that a minimum or maximum value of a function of θ be found. In practice, it is acceptable to use approximation techniques that provide values that are not the actual minimum or maximum values, but which are close to the actual minimum or maximum values. This is because the imprecision of the search for minimum or maximum values does not compromise compliance with required delay bounds or packet loss rates. Instead, it merely affects the efficiency of resource utilization.

Using the above-described techniques, one is able to increase efficiency of shared medium utilization using statistical multiplexing while the pre-defined delay limit for transmitting speech packets is never exceeded, and the ratio of lost speech packets versus total number of transmitted speech packets is limited.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of establishing a new connection that will supply new variable length data packets to be transmitted in a shared system for transmitting variable length data packets, the method comprising the steps of:

determining whether establishment of a new connection that generates variable length data packets will cause the shared system to exceed a predefined sample loss rate by using information about a data packet repetition rate that is common to all connections and information about a distribution of packet sizes for each existing connection and for the new connection;

establishing the new connection if it is determined that the predefined sample loss rate will not be exceeded; and rejecting the new connection if it is determined that the predefined sample loss rate will be exceeded.

2. A method for establishing a new connection that will supply new variable bit rate data packets to be transmitted in a shared system for transmitting variable bit rate data packets, the method comprising the steps of:

for the new connection, determining a value of a moment generating function defined as:

$$\psi_X(\Theta) = \sum_{i=1}^{S} P_i e^{\Theta R_i}$$

where S is the number of possible data packet sizes for the new connection, $(R_i, P_i)$ pairs are possible new connection data packet sizes, $R_i$, with corresponding assigned probabilities, $P_i$, and $\theta$ is an arbitrary positive real number;

determining whether any value of $\theta$ exists that satisfies the Chernoff bound as expressed in the following inequality:

$$-\Theta L_{buf} + \sum_j \log \psi_{X_j}(\Theta) \leq \log P_e$$

where j indexes through all established connections and the new connection, $L_{buf}$ is a length of a buffer for storing data packets supplied to the shared system for transmitting variable bit rate data packets, and $P_e$ is a predefined packet loss rate that can be tolerated in the shared system for transmitting variable bit rate data packets;

if a value of $\theta$ exists that satisfies the Chernoff bound, then establishing the new connection; and if no value of $\theta$ exists that satisfies the Chernoff bound, then rejecting the new connection.

3. The method of claim 2, wherein the step of determining whether any value of $\theta$ exists that satisfies the Chernoff bound comprises the step of retrieving values of the moment generating function for all established connections from data storage means.

4. The method of claim 2, further comprising the step of determining $L_{buf}$ in accordance with the following equation:

$$L_{buf} = D_{limit} \cdot r$$

where $D_{limit}$ is a predefined delay limit and r is a predefined rate of packet transmission in the shared system for transmitting variable bit rate data packets.

5. The method of claim 2, wherein the buffer is a first-in-first-out (FIFO) queue, and further comprising the step of inserting each arriving data packet at the end of the FIFO queue.

6. The method of claim 2, wherein the new variable bit rate data packets are new variable rate compressed speech packets.

7. A method for establishing a new connection that will supply new variable bit rate data packets to be transmitted in a shared system for transmitting variable bit rate data packets, wherein every data source in the shared system provides variable bit rate data packets having identical size distributions, the method comprising the steps of:

determining a value of $\theta$ that minimizes the left side of the inequality:

$$-\Theta L_{buf} + n \cdot \log \psi_x(\Theta) \leq \log P_e$$

where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, and $$\psi_X(\Theta) = \sum_{i=1}^{S} P_i e^{\Theta R_i}$$

where S is the number of possible data packet sizes for each connection, $(R_i, P_i)$ pairs are possible connection data packet sizes, $R_i$, with corresponding assigned probabilities, $P_i$, and $\theta$ is an arbitrary positive real number;

using the determined value of $\theta$ and the inequality to determine n, the maximum number of speech connections;

establishing the new connection if the number of existing connections is less than the determined value of n; and rejecting the new connection if the number of existing connections is greater than or equal to the determined value of n.

8. The method of claim 7, wherein the new variable bit rate data packets are new variable rate speech packets.

9. A method of setting a rate of transmission of a shared system for transmitting variable bit rate data packets, wherein every data source in the shared system provides variable bit rate data packets having identical size distributions, comprising the steps of:

determining a value for a minimum rate, r, in accordance with the following dimensioning rule:

$$n \cdot \alpha(\Theta_0) + \beta(\Theta_0) < r$$

where n is a predetermined maximum number of connections, $$\alpha(\Theta_0) = \frac{\log \psi_X(\Theta_0)}{D_{limit} \cdot \Theta_0}$$

$$\beta(\Theta_0) = -\frac{\log P_e}{D_{limit} \cdot \Theta_0}$$

and $\theta_0$ is selected so that $$-\Theta_0 L_{buf} + n_0 \cdot \log \psi_x(\Theta_0)$$

is minimal for a value of $n_0$ that is selected arbitrarily in the same order of magnitude in which the dimensioning rule will be used, where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, $D_{limit}$ is a predefined delay limit and $$\psi_X(\Theta) = \sum_{i=1}^{S} P_i e^{\Theta R_i}$$

where S is the number of possible data packet sizes for each connection, $(R_i, P_i)$ pairs are possible data packet sizes, $R_i$, with corresponding assigned probabilities, $P_i$, and $\theta$ is an arbitrary positive real number; and setting the rate of transmission of the shared system for transmitting variable bit rate data packets to be greater than or equal to the value of the minimum rate, r.

10. A method of setting a maximum number of connections that can be established in a shared system for transmitting variable bit rate data packets, wherein every data source in the shared system provides variable bit rate data packets having identical size distributions, comprising the steps of:

determining a value for the maximum number of connections, n, in accordance with the following dimensioning rule:

$$n \cdot \alpha(\Theta_0) + \beta(\Theta_0) < r$$

where r is a predetermined rate of transmission of the shared system, $$\alpha(\Theta_0) = \frac{\log \psi_X(\Theta_0)}{D_{limit} \cdot \Theta_0}$$

$$\beta(\Theta_0) = -\frac{\log P_e}{D_{limit} \cdot \Theta_0}$$

and $\Theta_0$ is selected so that $$-\Theta_0 L_{buf} + n_0 \cdot \log \psi_X(\Theta_0)$$

is minimal for a value of no that is selected arbitrarily in the same order of magnitude in which the dimensioning rule will be used, where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, $D_{limit}$, is a predefined delay limit and $$\psi_X(\Theta) = \sum_{i=1}^{S} P_i e^{\Theta R_i}$$

where S is the number of possible data packet sizes for each connection, $(R_i, P_i)$ pairs are possible data packet sizes, $R_i$, with corresponding assigned probabilities, $P_i$, and $\theta$ is an arbitrary positive real number; and adjusting the shared system so that it will accept no more than the determined value for the maximum number of connections, n.

11. An apparatus for establishing a new connection that will supply new variable length data packets to be transmitted in a shared system for transmitting variable length data packets, the apparatus comprising:

means for determining whether establishment of a new connection that generates variable length data packets will cause the shared system to exceed a predefined sample loss rate by using information about a data packet repetition rate that is common to all connections and information about a distribution of packet sizes for each existing connection and for the new connection;

means for establishing the new connection if it is determined that the predefined sample loss rate will not be exceeded; and means for rejecting the new connection if it is determined that the predefined sample loss rate will be exceeded.

12. An apparatus for establishing a new connection that will supply new variable bit rate data packets to be transmitted in a shared system for transmitting variable bit rate data packets, the apparatus comprising:

means for determining a value of a moment generating function for the new connection, the moment generating function being defined as:

$$\psi_X(\Theta) = \sum_{i=1}^{S} P_i e^{\Theta R_i}$$

where S is the number of possible data packet sizes for the new connection, $(R_i, P_i)$ pairs are possible new connection data packet sizes, $R_i$, with corresponding assigned probabilities, $P_i$, and $\theta$ is an arbitrary positive real number;

means for determining whether any value of $\theta$ exists that satisfies the Chernoff bound as expressed in the following inequality:

$$-\Theta L_{buf} + \sum_j \log \psi_{X_j}(\Theta) \leq \log P_e$$

where j indexes through all established connections and the new connection, $L_{buf}$ is a length of a buffer for storing data packets supplied to the shared system for transmitting variable bit rate data packets, and $P_e$ is a predefined packet loss rate that can be tolerated in the shared system for transmitting variable bit rate data packets; and means for establishing the new connection if a value of $\theta$ exists that satisfies the Chernoff bound, and for rejecting the new connection if no value of $\theta$ exists that satisfies the Chernoff bound.

13. The apparatus of claim 12, wherein the means for determining whether any value of $\theta$ exists that satisfies the Chernoff bound comprises means for retrieving values of the moment generating function for all established connections from data storage means.

14. The apparatus of claim 12, further comprising means for determining $L_{buf}$ in accordance with the following equation:

$$L_{buf} = D_{limit} \cdot r$$

where $D_{limit}$ is a predefined delay limit and r is a predefined rate of packet transmission in the shared system for transmitting variable bit rate data packets.

15. The apparatus of claim 12, wherein the buffer is a first-in-first-out (FIFO) queue, and further comprising means for inserting each arriving data packet at the end of the FIFO queue.

16. The apparatus of claim 12, wherein the new variable bit rate data packets are new variable rate compressed speech packets.

17. An apparatus for establishing a new connection that will supply new variable bit rate data packets to be transmitted in a shared system for transmitting variable bit rate data packets, wherein every data source in the shared system provides variable bit rate data packets having identical size distributions, the apparatus comprising:

means for determining a value of $\theta$ that minimizes the left side of the inequality:

$$-\Theta L_{buf} + n \cdot \log \psi_X(\Theta) \leq \log P_e$$

where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, and $$\psi_X(\Theta) = \sum_{i=1}^{S} P_i e^{\Theta R_i}$$

where S is the number of possible data packet sizes for each connection, $(R_i, P_i)$ pairs are possible connection data packet sizes, $R_i$, with corresponding assigned probabilities, $P_i$, and $\theta$ is an arbitrary positive real number;

means for using the determined value of $\theta$ and the inequality to determine n, the maximum number of speech connections; and means for establishing the new connection if the number of existing connections is less than the determined value of n, and for rejecting the new connection if the number of existing connections is greater than or equal to the determined value of n.

18. The apparatus of claim 17, wherein the new variable bit rate data packets are new variable rate speech packets.

19. An apparatus for setting a rate of transmission of a shared system for transmitting variable bit rate data packets, wherein every data source in the shared system provides variable bit rate data packets having identical size distributions, comprising:

means for determining a value for a minimum rate, r, in accordance with the following dimensioning rule:

$$n \cdot \alpha(\Theta_0) + \beta(\Theta_0) < r$$

where n is a predetermined maximum number of connections, $$\alpha(\Theta_0) = \frac{\log \psi_X(\Theta_0)}{D_{limit} \cdot \Theta_0}$$

$$\beta(\Theta_0) = -\frac{\log P_e}{D_{limit} \cdot \Theta_0}$$

and $\theta_0$ is selected so that $$-\Theta_0 L_{buf} + n_0 \cdot \log \psi_X(\Theta_0)$$

is minimal for a value of no that is selected arbitrarily in the same order of magnitude in which the dimensioning rule will be used, where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, $D_{limit}$ is a predefined delay limit and $$\psi_X(\Theta) = \sum_{i=1}^{S} P_i e^{\Theta R_i}$$

where S is the number of possible data packet sizes for each connection, $(R_i, P_i)$ pairs are possible data packet sizes, $R_i$, with corresponding assigned probabilities, $P_i$, and $\theta$ is an arbitrary positive real number; and means for setting the rate of transmission of the shared system for transmitting variable bit rate data packets to be greater than or equal to the value of the minimum rate, r.

20. An apparatus for setting a maximum number of connections that can be established in a shared system for transmitting variable bit rate data packets, wherein every data source in the shared system provides variable bit rate data packets having identical size distributions, comprising:

means for determining a value for the maximum number of connections, n, in accordance with the following dimensioning rule:

$$n \cdot \alpha(\Theta_0) + \beta(\Theta_0) < r$$

where r is a predetermined rate of transmission of the shared system, $$\alpha(\Theta_0) = \frac{\log \psi_X(\Theta_0)}{D_{limit} \cdot \Theta_0}$$

$$\beta(\Theta_0) = -\frac{\log P_e}{D_{limit} \cdot \Theta_0}$$

and $\Theta_0$ is selected so that $$-\Theta_0 L_{buf} + n_0 \cdot \log \Psi_X(\Theta_0)$$

is minimal for a value of $n_0$ that is selected arbitrarily in the same order of magnitude in which the dimensioning rule will be used, where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, $D_{limit}$ is a predefined delay limit and $$\psi_X(\Theta) = \sum_{i=1}^{S} P_i e^{\Theta R_i}$$

where S is the number of possible data packet sizes for each connection, $(R_i, P_i)$ pairs are possible data packet sizes, $R_i$, with corresponding assigned probabilities, $P_i$, and $\Theta$ is an arbitrary positive real number; and means for adjusting the shared system so that it will accept no more than the determined value for the maximum number of connections, n.

21. An article of manufacture comprising:

a computer usable medium having computer readable program code means embodied therein for establishing a new connection that will supply new variable length data packets to be transmitted in a shared system for transmitting variable length data packets, the computer readable program code means in said article of manufacture comprising:

computer readable program code means for causing a computer to determine whether establishment of a new connection that generates variable length data packets will cause the shared system to exceed a predefined sample loss rate by using information about a data packet repetition rate that is common to all connections and information about a distribution of packet sizes for each existing connection and for the new connection;

computer readable program code means for causing the computer to establish the new connection if it is determined that the predefined sample loss rate will not be exceeded; and computer readable program code means for causing the computer to reject the new connection if it is determined that the predefined sample loss rate will be exceeded.

22. An article of manufacture comprising:

a computer usable medium having computer readable program code means embodied therein for establishing a new connection that will supply new variable bit rate data packets to be transmitted in a shared system for transmitting variable bit rate data packets, the computer readable program code means in said article of manufacture comprising:

computer readable program code means for causing a computer to determine, for the new connection, a value of a moment generating function defined as:

$$\psi_X(\Theta) = \sum_{i=1}^{S} P_i e^{\Theta R_i}$$

where S is the number of possible data packet sizes for the new connection, ($R_i$, $P_i$) pairs are possible new connection data packet sizes, $R_i$, with corresponding assigned probabilities, $P_i$, and $\theta$ is an arbitrary positive real number;

computer readable program code means for causing the computer to determine whether any value of $\theta$ exists that satisfies the Chernoff bound as expressed in the following inequality:

$$-\Theta L_{buf} + \sum_{j} \log \psi_{X_j}(\Theta) \le \log P_e$$

where j indexes through all established connections and the new connection, $L_{buf}$ is a length of a buffer for storing data packets supplied to the shared system for transmitting variable bit rate data packets, and $P_e$ is a predefined packet loss rate that can be tolerated in the shared system for transmitting variable bit rate data packets;

computer readable program code means for causing the computer to establish the new connection if a value of $\theta$ exists that satisfies the Chernoff bound; and computer readable program code means for causing the computer to reject the new connection if no value of $\theta$ exists that satisfies the Chernoff bound.

23. The article of manufacture of claim 22, wherein the computer readable program code means for causing the computer to determine whether any value of $\Theta$ exists that satisfies the Chernoff bound comprises computer readable program code means for causing the computer to retrieve values of the moment generating function for all established connections from data storage means.

24. The article of manufacture of claim 22, further comprising computer readable program code means for causing the computer to determine $L_{buf}$ in accordance with the following equation:

$$L_{buf} = D_{limit} \cdot r$$

where $D_{limit}$ is a predefined delay limit and r is a predefined rate of packet transmission in the shared system for transmitting variable bit rate data packets.

25. The article of manufacture of claim 22, wherein the buffer is a first-in-first-out (FIFO) queue, and further comprising computer readable program code means for causing the computer to insert each arriving data packet at the end of the FIFO queue.

26. The article of manufacture of claim 22, wherein the new variable bit rate data packets are new variable rate compressed speech packets.

27. An article of manufacture comprising:

a computer usable medium having computer readable program code means embodied therein for establishing a new connection that will supply new variable bit rate data packets to be transmitted in a shared system for transmitting variable bit rate data packets, wherein every data source in the shared system provides variable bit rate data packets having identical size distributions, the computer readable program code means in said article of manufacture comprising:

computer readable program code means for causing a computer to determine a value of $\theta$ that minimizes the left side of the inequality:

$$-\Theta L_{buf} + n \cdot \log \psi_X(\Theta) \le \log P_e$$

where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, and $$\psi_X(\Theta) = \sum_{i=1}^{S} P_i e^{\Theta R_i}$$

where S is the number of possible data packet sizes for each connection, ($R_i$, $P_i$) pairs are possible connection data packet sizes, $R_i$, with corresponding assigned probabilities, $P_i$, and $\theta$ is an arbitrary positive real number;

computer readable program code means for causing the computer to use the determined value of $\theta$ and the inequality to determine n, the maximum number of speech connections;

computer readable program code means for causing the computer to establish the new connection if the number of existing connections is less than the determined value of n; and computer readable program code means for causing the computer to reject the new connection if the number of existing connections is greater than or equal to the determined value of n.

28. The article of manufacture of claim 27, wherein the new variable bit rate data packets are new variable rate speech packets.

29. An article of manufacture comprising:

a computer usable medium having computer readable program code means embodied therein for setting a rate of transmission of a shared system for transmitting variable bit rate data packets, wherein every data source in the shared system provides variable bit rate data packets having identical size distributions, the computer readable program code means in said article of manufacture comprising:

computer readable program code means for causing a computer to determine a value for a minimum rate, r, in accordance with the following dimensioning rule:

$$n \cdot \alpha(\Theta_0) + \beta(\Theta_0) < r$$

where n is a predetermined maximum number of connections, $$\alpha(\Theta_0) = \frac{\log \psi_X(\Theta_0)}{D_{limit} \cdot \Theta_0}$$

$$\beta(\Theta_0) = -\frac{\log P_e}{D_{limit} \cdot \Theta_0}$$

and $\theta_0$ is selected so that $$-\Theta_0 L_{buf} + n_0 \cdot \log \psi_x(\Theta_0)$$

is minimal for a value of $n_0$ that is selected arbitrarily in the same order of magnitude in which the dimensioning rule will be used,
where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, $D_{limit}$ is a predefined delay limit and $$\psi_X(\Theta) = \sum_{i=1}^{S} P_i e^{\Theta R_i}$$

where S is the number of possible data packet sizes for each connection, $(R_i, P_i)$ pairs are possible data packet sizes, $R_i$, with corresponding assigned probabilities, $P_i$, and $\theta$ is an arbitrary positive real number; and
computer readable program code means for causing the computer to set the rate of transmission of the shared system for transmitting variable bit rate data packets to be greater than or equal to the value of the minimum rate, r.

30. An article of manufacture comprising:
a computer usable medium having computer readable program code means embodied therein for setting a maximum number of connections that can be established in a shared system for transmitting variable bit rate data packets, wherein every data source in the shared system provides variable bit rate data packets having identical size distributions, the computer readable program code means in said article of manufacture comprising:
computer readable program code means for causing a computer to determine a value for the maximum number of connections, n, in accordance with the following dimensioning rule:

$$n \cdot \alpha(\Theta_0) + \beta(\Theta_0) < r$$

where r is a predetermined rate of transmission of the shared system, $$\alpha(\Theta_0) = \frac{\log \psi_X(\Theta_0)}{D_{limit} \cdot \Theta_0}$$

$$\beta(\Theta_0) = -\frac{\log P_e}{D_{limit} \cdot \Theta_0}$$

and $\theta_0$ is selected so that $$-\Theta_0 L_{buf} + n_0 \cdot \log \psi_x(\Theta_0)$$

is minimal for a value of $n_0$ that is selected arbitrarily in the same order of magnitude in which the dimensioning rule will be used,
where $L_{buf}$ is a length of a buffer for storing data packets supplied to the shared system for transmitting variable bit rate data packets, $P_e$ is a predefined packet loss rate that can be tolerated in the shared system for transmitting variable bit rate data packets, $D_{limit}$ is a predefined delay limit and $$\psi_X(\Theta) = \sum_{i=1}^{S} P_i e^{\Theta R_i}$$

where S is the number of possible data packet sizes for each connection, $(R_i, P_i)$ pairs are possible data packet sizes, $R_i$, with corresponding assigned probabilities, $P_i$, and $\theta$ is an arbitrary positive real number; and
computer readable program code means for causing a computer to adjust the shared system so that it will accept no more than the determined value for the maximum number of connections, n.

\* \* \* \* \*